(12) United States Patent
Okochi et al.

(10) Patent No.: US 9,330,114 B2
(45) Date of Patent: May 3, 2016

(54) DATA PROCESSING APPARATUS, DATA PROCESSING METHOD, AND RECORDING MEDIUM STORING COMPUTER PROGRAM FOR PERFORMING DATA PROCESSING

(71) Applicant: FUJITSU LIMITED, Kawasaki-shi, Kanagawa (JP)

(72) Inventors: Toshiki Okochi, Ota (JP); Yuji Wada, Ota (JP); Kuniaki Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/609,519

(22) Filed: Jan. 30, 2015

(65) Prior Publication Data

US 2015/0254243 A1 Sep. 10, 2015

(30) Foreign Application Priority Data

Mar. 5, 2014 (JP) .................................. 2014-042834

(51) Int. Cl.
*G06K 9/60* (2006.01)
*G06F 17/30* (2006.01)

(52) U.S. Cl.
CPC .................................. *G06F 17/3028* (2013.01)

(58) Field of Classification Search
USPC .......................... 382/305, 281, 245, 248, 103; 250/201.2; 345/501, 502, 522; 358/1.9, 358/403; 359/698; 396/133
See application file for complete search history.

(56) References Cited

U.S. PATENT DOCUMENTS

| | | | | |
|---|---|---|---|---|
| 4,817,050 A | * | 3/1989 | Komatsu | G06F 19/321 |
| 5,146,071 A | * | 9/1992 | Ookubo | G02B 7/285 250/201.2 |
| 5,384,643 A | * | 1/1995 | Inga | H04N 1/2179 358/1.9 |
| 6,625,625 B1 | | 9/2003 | Kihara et al. | 707/204 |
| 2004/0236803 A1 | | 11/2004 | Spiegeleer | 707/204 |

FOREIGN PATENT DOCUMENTS

| | | |
|---|---|---|
| JP | 2000-200208 | 7/2000 |
| JP | 2000-293420 | 10/2000 |
| JP | 2005-501342 | 1/2005 |
| WO | WO 03/019412 | 3/2003 |

* cited by examiner

*Primary Examiner* — Anh Do
(74) *Attorney, Agent, or Firm* — Staas & Halsey LLP

(57) ABSTRACT

A non-transitory, computer-readable recording medium having stored therein a program for causing a computer to execute a process, the process comprising: detecting whether second data, stored in a second storage device, updated from first data stored in a first storage device has been updated, upon detecting that the second data has been updated, obtaining the second data before update from the second storage device, and storing the second data into the first storage device, and when the second data is contained in the first storage device, obtaining the second data from the first storage device, and generating third data using the second data, and the first data.

12 Claims, 9 Drawing Sheets

DATA PROCESSING APPARATUS, DATA PROCESSING METHOD, AND RECORDING MEDIUM STORING COMPUTER PROGRAM FOR PERFORMING DATA PROCESSING

CROSS-REFERENCE TO RELATED APPLICATION

This application is based upon and claims the benefit of priority of the prior Japanese Patent Application No. 2014-042834, filed on Mar. 5, 2014, the entire contents of which are incorporated herein by reference.

FIELD

The embodiments discussed herein are related to a data processing apparatus, a data processing method, and a recording medium storing a computer program for performing data processing.

BACKGROUND

Management apparatuses that manage system backup images (hereinafter referred to as "images") for restoring an apparatus, such as a virtual machine (VM), or the like are provided. A description will be given of an example of such a management apparatus. A management apparatus does not hold data that is allowed to be obtained through the Internet, for example, data held by an external repository, or the like among data included in the image of the apparatus, because the data is allowed to be obtained through the Internet. Then, the management apparatus obtains data through the Internet at predetermined timing, for example, at timing when the apparatus is restored, or the like, and generates an image for restoring the apparatus using the obtained data, and the image data held by the management apparatus.

Related techniques are disclosed in Japanese Laid-open Patent Publication Nos. 2000-200208 and 2000-293420, and Japanese National Publication of International Patent Application No. 2005-501342.

However, as described in the following, with data obtained by the above-described management apparatus, there is a problem in that when the data held in an external repository is updated, it is sometimes difficult to deal with the data in order to restore the apparatus, or the like.

For example, data held in an external repository is sometimes updated by a user who uses the external repository. Also, an external repository sometimes does not hold all updated data, and holds only a predetermined number of generations of the data. Accordingly, even if the above-described management apparatus attempts to obtain data before update at predetermined timing through the Internet, the data before the update is not held in the external repository, and thus the management apparatus sometimes fails in obtaining the data before the update. Also, it is thought that in the case where the management apparatus is not allowed to obtain the data before the update, the management apparatus obtains data after the update, and attempts to generate an image for restoring the apparatus using the obtained data and the image data held by the management apparatus. However, since the obtained data has been updated, there are cases where the management apparatus fails in generating an image for restoring the apparatus. Accordingly, there is a problem in that it is difficult to deal with the case, such as to restore the apparatus, or the like when data held in an external repository is updated with the above-described obtained data by the management apparatus. In this regard, such a problem occurs not only in the case where data held by the external repository is updated, but also in the case where data stored in a storage device other than the external repository is updated in the same manner. Also, such a problem is not limited to the problem of unable to restoring the apparatus.

SUMMARY

According to an aspect of the embodiments, a non-transitory, computer-readable recording medium having stored therein a program for causing a computer to execute a process, the process comprising: detecting whether second data, stored in a second storage device, updated from first data stored in a first storage device has been updated, upon detecting that the second data has been updated, obtaining the second data before update from the second storage device, and storing the second data into the first storage device, and when the second data is contained in the first storage device, obtaining the second data from the first storage device, and generating third data using the second data, and the first data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the following, a detailed description will be given of each of embodiments of a data processing program, a data processing apparatus, and a data processing method according to the present disclosure with reference to the drawings. In this regard, each of the embodiments will not limit the technique of the disclosure.

Figure 1:
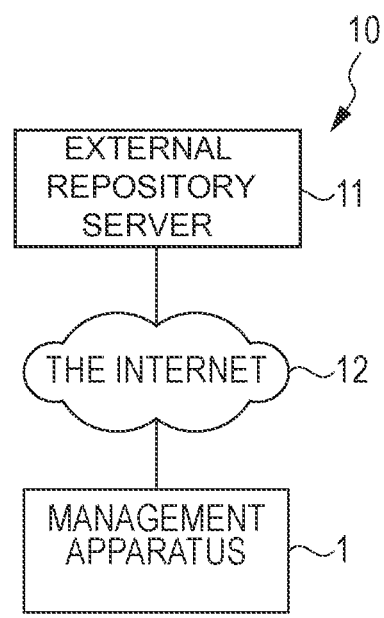
FIG. 1 is a diagram illustrating an example of a system configuration to which a management apparatus, which is an example of a data processing apparatus according to an embodiment, is applied.

FIG. 1 is a diagram illustrating an example of a system configuration to which a management apparatus, which is an example of a data processing apparatus according to an embodiment, is applied. As illustrated by the example in FIG. 1, a system 10 includes an external repository server 11, and a management apparatus 1. The external repository server 11 and the management apparatus 1 are connected through the Internet 12.

The external repository server 11 is a server that stores open source software, and provides the software through the Internet 12. Such software is updated by a user who uses the external repository server 11. If certain software has been updated for a plurality of times, the external repository server 11 according to the present embodiment does not store software of all the generations, but stores software of a predetermined number of the latest generations (for example, three generations). The external repository server 11 is, for example, a Yellowdog Updater Modified (yum) external repository server, a RedHat Update Infrastructure (RHUI), or the like. Also, the external repository server 11 is an example of a storage device, for example.

The management apparatus 1 restores a VM image file, for example, a disk image. Here, the management apparatus 1 deletes software stored in the external repository server 11 from a storage unit 4 in the management apparatus 1 among the software included in the disk image. Thereby, it is possible for the management apparatus 1 to suppress an increase in the size of data stored in the storage unit 4 in the management apparatus 1. Then, the management apparatus 1 performs the following processing in the case of restoring a VM image file, or the like. That is to say, the management apparatus 1 downloads the deleted software from the external repository server 11, and restores the VM image file using the downloaded software, and the disk image stored in the storage unit 4 in the management apparatus 1.

Further, the management apparatus 1 according to the present embodiment monitors whether the software deleted from the storage unit 4 in the management apparatus 1 has been updated or not among the software stored in the external repository server 11. Then, if the software has been updated, the management apparatus 1 downloads the software before the update from the external repository server 11. Thereby, even if the software has been updated in the external repository server 11, it is possible for the management apparatus 1 to obtain and to store the software capable of restoring the VM.

Example of functional configuration of management apparatus 1

Figure 2:
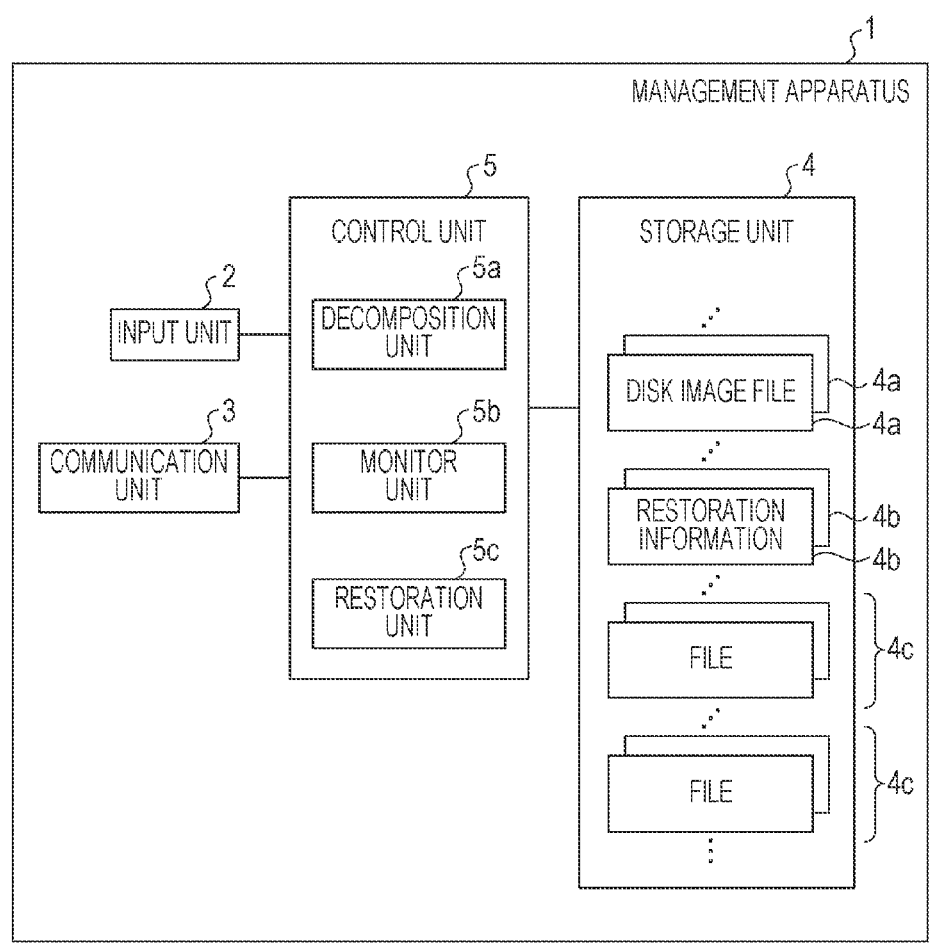
FIG. 2 is a diagram illustrating a functional configuration of the management apparatus according to the embodiment.

FIG. 2 is a diagram illustrating a functional configuration of the management apparatus 1 according to the embodiment. As illustrated in FIG. 2, the management apparatus 1 includes an input unit 2, a communication unit 3, a storage unit 4, and a control unit 5. In this regard, the storage unit 4 may be an external storage device connected to the management apparatus 1.

The input unit 2 inputs various kinds of information to the control unit 5. For example, if the input unit 2 receives specification of a target VM on which the below-described decomposition processing is executed from a user of the management apparatus 1, the input unit 2 inputs the received specification of the VM to the control unit 5. Also, if the input unit 2 receives an instruction of which VM disk image file 4a is to be restored from the user, the input unit 2 inputs the received instruction to the control unit 5. As an example of a device of the input unit 2, a mouse, a keyboard, or the like are given.

The communication unit 3 is an interface for performing communication between the management apparatus 1 and the other apparatus, not illustrated in FIG. 2, on which a VM is operated. The communication unit 3 is connected to the other apparatuses through the Internet 12 or a network.

The storage unit 4 stores various kinds of information. For example, the storage unit 4 stores a disk image file 4a for each VM to be restored, restoration information 4b for each VM, and a file group 4c for each VM.

The disk image file 4a is an image file of a VM disk, and an image file of a RedHat Package Manager (RPM) package, for example. Binary files of programs, and the like, and setting files are put together in the RPM package.

The restoration information 4b, and the file group 4c are information generated by a decomposition unit 5a described below, and a set of a plurality of files that are put together, respectively. The details will be described later.

The storage unit 4 is, for example, a semiconductor memory element, such as a flash memory, or the like, or a storage device, such as a hard disk, an optical disc, or the like.

The control unit 5 includes an internal memory for storing programs defining various processing procedures, and control data. A processor included in the management apparatus 1 executes various kinds of processing using the programs and the control data. As illustrated in FIG. 2, the control unit 5 includes a decomposition unit 5a, a monitor unit 5b, and a restoration unit 5c.

Figures 3, 4:
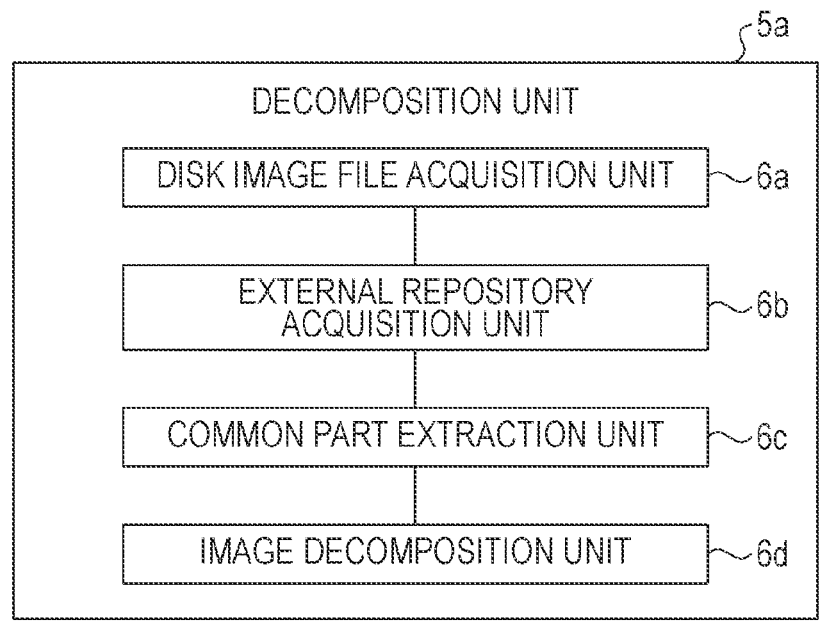
FIG. 3 is a diagram illustrating an example of a functional configuration of a decomposition unit according to the embodiment.
FIG. 4 is a diagram illustrating an example of a data list generated by a disk image file acquisition unit.

As described in the following, the decomposition unit 5a updates the disk image file 4a, and generates the restoration information 4b, and the file group 4c. FIG. 3 is a diagram illustrating an example of a functional configuration of the decomposition unit according to the embodiment. As illustrated in FIG. 3, the decomposition unit 5a includes a disk image file acquisition unit 6a, an external repository acquisition unit 6b, a common part extraction unit 6c, and an image decomposition unit 6d.

A description will be given of one mode of the disk image file acquisition unit 6a. For example, when the disk image file acquisition unit 6a receives specification of VM on which the decomposition processing described below is executed from the input unit 2, the disk image file acquisition unit 6a obtains a disk image file 4a corresponding to the specified VM. Then, the disk image file acquisition unit 6a obtains a list of RPM packages included in the obtained disk image file 4a, and records the obtained the list of RPM packages in the data list so as to generate a data list. FIG. 4 is a diagram illustrating an example of a data list generated by a disk image file acquisition unit. The example in FIG. 4 illustrates a case where the disk image file acquisition unit 6a recorded various RPM packages, and the like, such as "MAKEDEV-3.23-1.2.× 86_64", "PyXML-0.8.4-4.el5_4.2.×86_64" and the like in the data list.

A description will be given of one mode of the external repository acquisition unit 6b. The external repository acquisition unit 6ba obtains a list of open source software from the external repository 11.

A description will be given of one mode of the common part extraction unit 6c. The common part extraction unit 6c selects a RPM package recorded in the data list generated by the disk image file acquisition unit 6a one by one in sequence.

Then, the common part extraction unit 6c determines whether there is the same package as the selected RPM package in the list of open source software obtained by the external repository acquisition unit 6b each time the common part extraction unit 6c select one RPM package.

If there is the same package as the selected RPM package in the list of open source software, the common part extraction unit 6c performs the following processing between the selected RPM package, which is the same package, and the open source software. That is to say, the common part extraction unit 6c determines whether the contents of the file included in the RPM package, and the contents of the file included in the open source software having the same name as that file match completely for each binary. For example, the common part extraction unit 6c determines whether the file "/etc/makedev.d" included in the selected RPM package, and the file "/etc/makedev.d" included in the open source software match completely for each binary. Then, the common part extraction unit 6c makes a determination of such complete matching for all the files included in the selected RPM package.

A description will be given of one mode of the image decomposition unit 6d. If the common part extraction unit 6c has determined that the two files do not completely match for each binary, the image decomposition unit 6d extracts the file included in the selected RPM package between the two files that do not completely match. Then, the image decomposition unit 6d adds the extracted file to the file group corresponding to the specified VM. In this manner, the image decomposition unit 6d newly adds the file changed from the original file to the file group 4c corresponding to the specified VM.

For example, the image decomposition unit 6d performs the following processing if the file "httpd.conf" included in the RPM package "apache", and the file "httpd.conf" included in the open source software "apache" do not completely match. That is to say, the image decomposition unit 6d newly adds the file "httpd.conf" included in the selected RPM package "apache" to the file group 4c corresponding to the specified VM.

Also, if the file "server.xml" included in the RPM package "tomcat", and the file "server.xml" included in the open source software "tomcat" do not completely match, the image decomposition unit 6d performs the following processing. That is to say, the image decomposition unit 6d newly adds the file "server.xml" included in the selected RPM package "tomcat" to the file group 4c corresponding to the specified VM.

Then, if the common part extraction unit 6c determines that there is the same package as the selected RPM package in the list of the open source software, the image decomposition unit 6d performs the following processing. That is to say, the image decomposition unit 6d deletes the RPM package selected by the common part extraction unit 6c from the disk image file 4a corresponding to the specified VM. Then, the image decomposition unit 6d records the deleted RPM package in the restoration information 4b corresponding to the specified VM.

Figure 5:
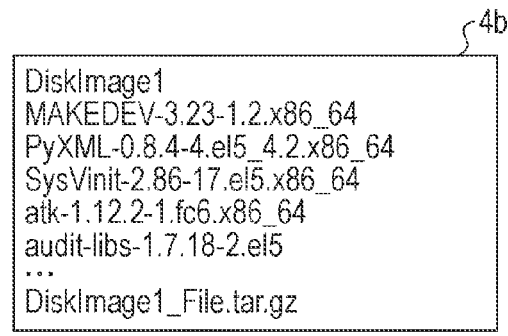
FIG. 5 is a diagram illustrating an example of a data structure of restoration information.

FIG. 5 is a diagram illustrating an example of a data structure of restoration information. The restoration information 4b illustrated in the example in FIG. 5 includes the name "DiskImage1" of the specified VM image, and the name "DiskImageLFile.targz" of the file group 4c corresponding to the specified VM. Also, the restoration information 4b illustrated in the example in FIG. 5 includes various RPM packages, such as "MAKEDEV-3.23-1.2.x86_64", "PyXML-0.8.4-4.el5_4.2.x86_64", and the like. Here, the name of the RPM package included in the restoration information 4b is the name of the RPM package stored in the external repository server 11.

Figure 6:
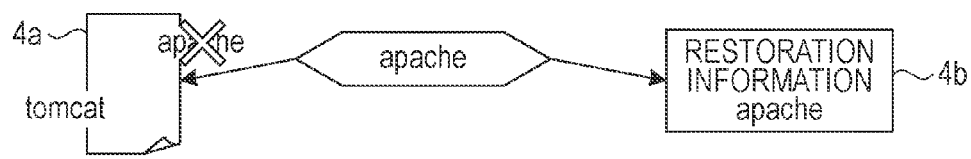
FIG. 6 is an explanatory diagram of an example of processing executed by an image decomposition unit.
Figure 7:
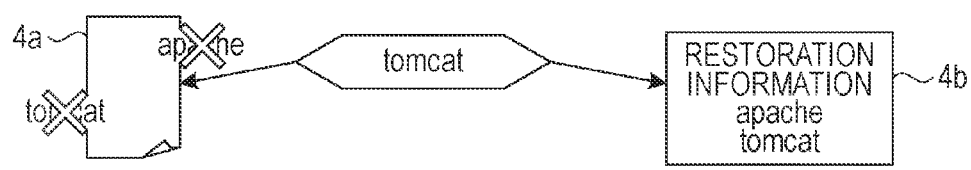
FIG. 7 is an explanatory diagram of an example of processing executed by the image decomposition unit.

FIG. 6 and FIG. 7 are explanatory diagrams of examples of processing executed by the image decomposition unit. As illustrated in the example in FIG. 6, if the common part extraction unit 6c determines that there is the same package as the selected RPM package "apache" in the list of the open source software, the image decomposition unit 6d performs the following processing. That is to say, the image decomposition unit 6d deletes the RPM package "apache", selected by the common part extraction unit 6c, from the disk image file 4a corresponding to the specified VM. Then, the image decomposition unit 6d records the deleted RPM package "apache" in the restoration information 4b corresponding to the specified VM.

Then, as illustrated by the example in FIG. 7, if the common part extraction unit 6c has determined that there is the same package as the selected RPM package "tomcat" in the list of the open source software, the image decomposition unit 6d performs the following processing. That is to say, the image decomposition unit 6d deletes the RPM package "tomcat" selected by the common part extraction unit 6c from the disk image file 4a corresponding to the specified VM. Then, the image decomposition unit 6d records the deleted RPM package "tomcat" in the restoration information 4b corresponding to the specified VM.

Figure 8:
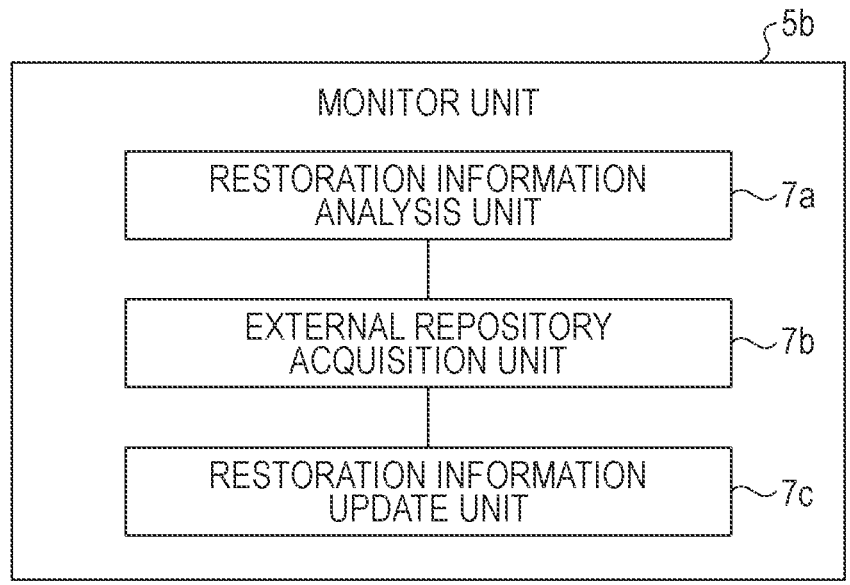
FIG. 8 is a diagram illustrating an example of a functional configuration of a monitor unit according to the embodiment.

Referring back to description of FIG. 2, as described in the following, the monitor unit 5b monitors whether the software stored in the external repository server 11 has been updated or not. If the software has been updated, the monitor unit 5b obtains the software before the update from the external repository server 11. The monitor unit 5b is an example of the detection unit. FIG. 8 is a diagram illustrating an example of a functional configuration of the monitor unit according to the embodiment. As illustrated by the example in FIG. 8, the monitor unit 5b includes a restoration information analysis unit 7a, an external repository acquisition unit 7b, and a restoration information update unit 7c.

A description will be given of one mode of the restoration information analysis unit 7a. For example, the restoration information analysis unit 7a obtains a list of RPM packages included in the restoration information 4b corresponding to a VM at predetermined time intervals for all the VMs, and records the list of obtained RPM packages in the restoration data list so as to generate a restoration data list. For example, the restoration information analysis unit 7a records various RPM packages, such as "MAKEDEV-3.23-1.2.x86_64", "PyXML-0.8.4-4.el5_4.2.x86_64", and the like in the restoration data list, thereby generating the restoration data list.

A description will be given of one mode of the external repository acquisition unit 7b. The external repository acquisition unit 7b downloads a RPM package recorded in the restoration data list from the external repository server 11 each time the restoration information analysis unit 7a generates a restoration data list. In this regard, the external repository acquisition unit 7b does not specify a version when downloading a RPM package.

A description will be given of one mode of the restoration information update unit 7c. The restoration information update unit 7c compares the version of the downloaded RPM package, and the version of the RPM package recorded in the restoration data list each time the external repository acquisition unit 7b downloads a RPM package. For example, the package name of the RPM package includes a numeric value representing a version of the package, and thus the restoration information update unit 7c compares the numeric values representing the versions. The higher this numeric value, the later version the package represents, for example. Then, as a result of the comparison, if the version of the downloaded RPM package is newer than the version of the RPM package recorded in the restoration data list, the restoration information update unit 7c performs the following processing. That is to say, the restoration information update unit 7c downloads the RPM package of the version (the version before the update) recorded in the restoration data list from the external repository server 11. Then, the restoration information update unit 7c adds the file of the downloaded RPM package to the file group 4c.

Then, the restoration information update unit 7c deletes the RPM package that has been newly added to the file group 4c from the restoration information 4a.

Figure 9:
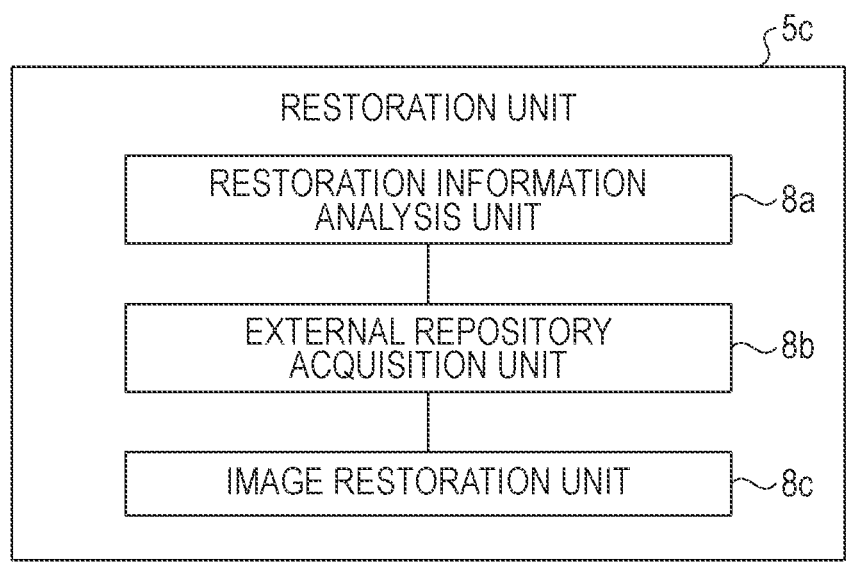
FIG. 9 is a diagram illustrating an example of a functional configuration of a restoration unit according to the embodiment.

Referring back to FIG. 2, the restoration unit 5c restores the disk image file 4a as described below. The restoration unit 5c is an example of the generation unit. FIG. 9 is a diagram illustrating an example of a functional configuration of a restoration unit according to the embodiment. As illustrated by the example in FIG. 9, the restoration unit 5c includes a restoration information analysis unit 8a, an external repository acquisition unit 8b, and an image restoration unit 8c.

A description will be given of one mode of the restoration information analysis unit 8a. For example, when an instruction of restoring the disk image file 4a of which VM is input from the input unit 2, the restoration information analysis unit 8a identifies the restoration information 4b corresponding to the VM to which the disk image file 4a is restored. Then, the restoration information analysis unit 8a obtains a list of RPM packages included in the identified restoration information 4b. Then, the restoration information analysis unit 8a records the list of obtained RPM packages in the restoration data list so as to generate a restoration data list. For example, the restoration information analysis unit 8a records various RPM packages, such as "MAKEDEV-3.23-1.2.×86_64", "PyXML-0.8.4-4.el5_4.2.×86_64", and the like in the restoration data list to generate the restoration data list.

A description will be given of one mode of the external repository acquisition unit 8b. Each time the restoration information analysis unit 8a generates a restoration data list, the external repository acquisition unit 8b downloads a RPM package recorded in the restoration data list from the external repository server 11. In this regard, the external repository acquisition unit 8b specifies a version at a time when downloading a RPM package.

A description will be given of one mode of the image restoration unit 8c. The image restoration unit 8c installs the downloaded RPM package in the disk image file 4a each time the external repository acquisition unit 8b downloads a RPM package for each VM. Further, the image restoration unit 8c copies the file group 4c to the disk image file 4a for each VM. Thereby, a disk image file 4a from which a VM is allowed to be restored is generated.

The control unit 5 is a circuit, such as an application specific integrated circuit (ASIC), a field programmable gate array (FPGA), a central processing unit (CPU), a micro processing unit (MPU), or the like.

Processing Flow

Figure 10:
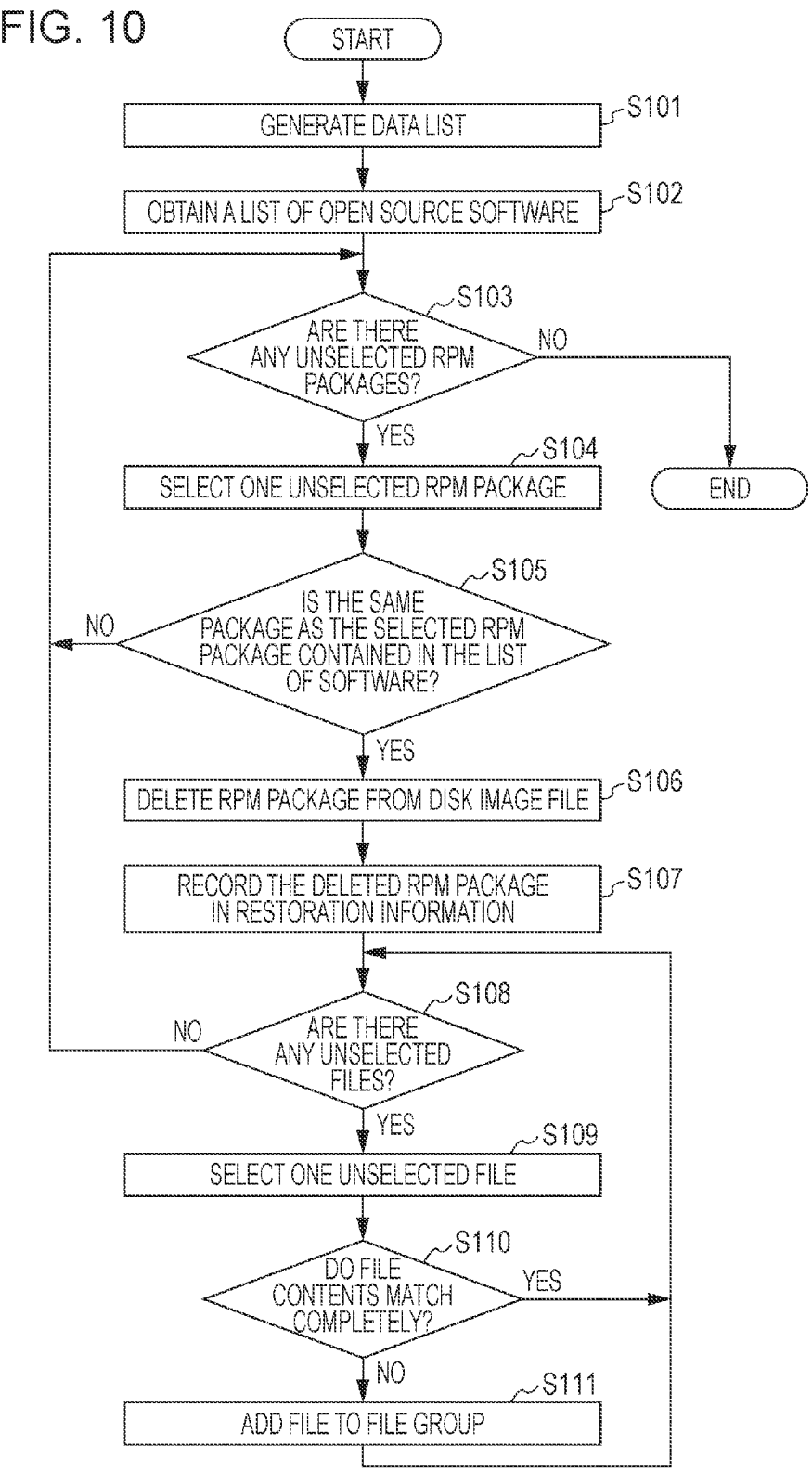
FIG. 10 is a flowchart illustrating a procedure of decomposition processing according to the embodiment.

Next, a description will be given of various processing flows executed by the management apparatus 1 according to the embodiment. FIG. 10 is a flowchart illustrating a procedure of decomposition processing according to the embodiment. The decomposition processing according to the embodiment is executed by the control unit 5 in the case where the input unit 2 inputs a specification of a VM on which the decomposition processing is executed to the control unit 5, for example.

As illustrated in FIG. 10, the disk image file acquisition unit 6a obtains the disk image file 4a corresponding to the specified VM. Then, the disk image file acquisition unit 6a obtains a list of RPM packages included in the obtained disk image file 4a, and records the list of obtained RPM packages in the data list so as to generate the data list (S101).

The external repository acquisition unit 6b obtains a list of open source software from the external repository 11 (S102).

The common part extraction unit 6c determines whether there are any unselected RPM packages in the RPM package recorded in the data list generated by the disk image file acquisition unit 6a or not (S103). If there are unselected RPM packages (S103; Yes), the common part extraction unit 6c selects one unselected RPM package (S104).

Then, the common part extraction unit 6c determines whether there are the same package as the selected RPM package in the list of the open source software obtained by the external repository acquisition unit 6b or not (S105).

If there are the same package in the list of the open source software (S105; Yes), the image decomposition unit 6d deletes the RPM package selected by the common part extraction unit 6c from the disk image file 4a corresponding to the specified VM (S106). Then, the image decomposition unit 6d records the deleted RPM package in the restoration information 4b corresponding to the specified VM (S107).

Then, the common part extraction unit 6c determines whether there are unselected files in the files included in the selected RPM package (S108). If there are unselected files (S108; Yes), the common part extraction unit 6c selects one unselected file (S109). Then, the common part extraction unit 6c determines whether the contents of the selected file of the same package, and the contents of the file included in the open source software having the same name completely match for each binary (S110). If the contents completely match (S110; Yes), the common part extraction unit 6c returns to S108.

On the other hand, if the contents do not completely match (S110; No), the common part extraction unit 6c extracts a file included in the selected RPM package out of the two files determined not to completely match. Then, the image decomposition unit 6d adds the extracted file to the file group 4c corresponding to the specified VM (S111), and returns to S108.

On the other hand, if there are no unselected files (S108; No), or if there are no same packages in the list of the open source software (S105; No), the processing returns to S103.

Then, if there are no unselected RPM package (S103; No), the common part extraction unit 6c terminates the processing.

Figure 11:
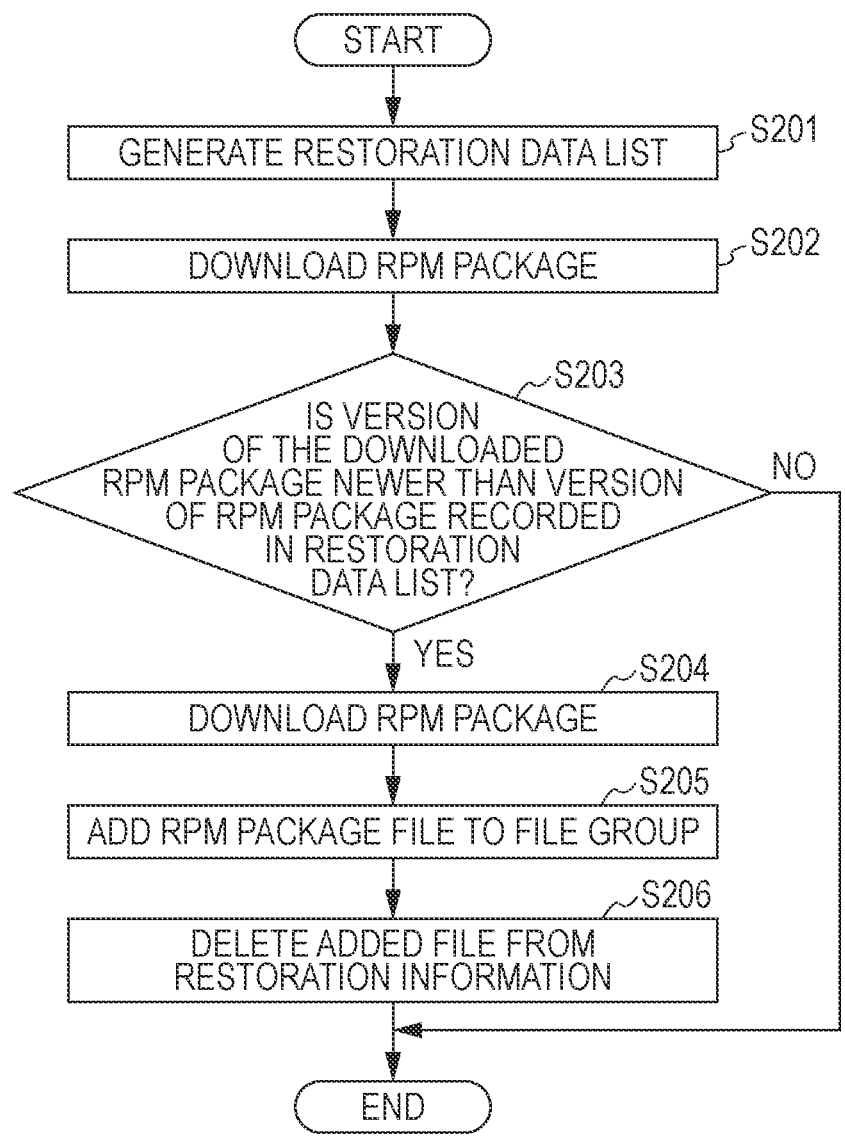
FIG. 11 is a flowchart illustrating a procedure of monitor processing according to the embodiment.

FIG. 11 is a flowchart illustrating a procedure of the monitor processing according to the embodiment. The monitor processing according to the embodiment is executed by the control unit 5 at predetermined time intervals, for example.

As illustrated in FIG. 11, the restoration information analysis unit 7a obtains a list of the RPM packages included in the restoration information 4b corresponding to a VM at predetermined time intervals for all the VMs. Then, the restoration information analysis unit 7a records the list of obtained RPM packages in the restoration data list so as to generate a restoration data list (S201).

Each time the restoration information analysis unit 7a generates a restoration data list, the external repository acquisition unit 7b downloads a RPM package recorded in the restoration data list from the external repository server 11

(S202). In this regard, the external repository acquisition unit 7b does not specify a version when downloading a RPM package.

Then, the restoration information update unit 7c compares the version of the downloaded RPM package, and the version of the RPM packages recorded in the restoration data list. Then, the restoration information update unit 7c determines whether the version of the downloaded RPM package is newer than the version of the RPM package recorded in the restoration data list or not as a result of the comparison (S203).

If the downloaded RPM package is newer (S203; Yes), the restoration information update unit 7c performs the following processing. That is to say, the restoration information update unit 7c downloads the RPM package of the version (version before the update) recorded in the restoration data list from the external repository server 11 (S204). Then, the restoration information update unit 7c adds the file of the downloaded RPM package to the file group 4c (S205).

Then, the restoration information update unit 7c deletes the RPM package that has been newly added to the file group 4c from the restoration information 4a (S206), and terminates the processing. Also, if the downloaded RPM package is not newer (S203; No), the restoration information update unit 7c terminates the processing.

Figure 12:
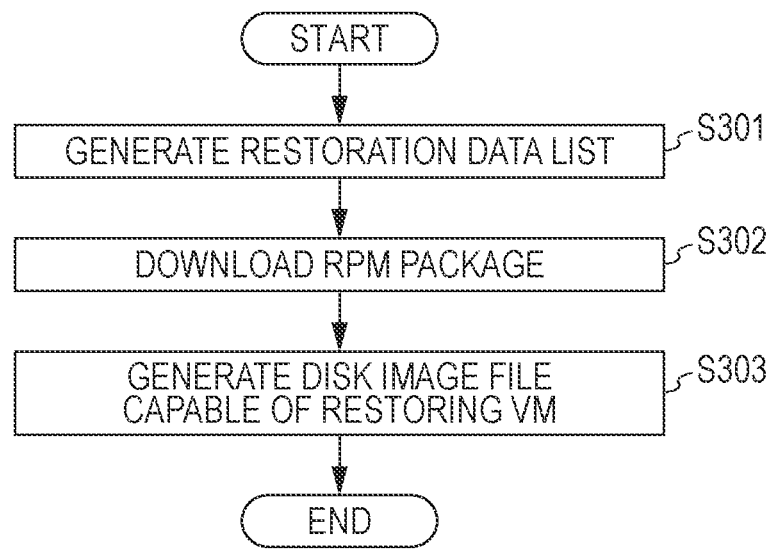
FIG. 12 is a flowchart illustrating a procedure of restoration processing according to the embodiment.

FIG. 12 is a flowchart illustrating a procedure of the restoration processing according to the embodiment. The restoration processing according to the embodiment is executed by the control unit 5 when an instruction of restoring the disk image file 4a of which VM is restored is input from the input unit 2, for example.

As illustrated in FIG. 12, the restoration information analysis unit 8a identifies the restoration information 4b corresponding to the VM whose disk image file 4a is to be restored. Then, the restoration information analysis unit 8a obtains the list of RPM packages included in the identified restoration information 4b. Then, the restoration information analysis unit 8a records the list of obtained RPM packages in the restoration data list so as to generate a restoration data list (S301).

The external repository acquisition unit 8b downloads the RPM package recorded in the restoration data list from the external repository server 11 (S302). In this regard, the external repository acquisition unit 8b specifies a version at a time when downloading the RPM package.

The image restoration unit 8c installs the downloaded RPM package in the disk image file 4a for each VM. Further, the image restoration unit 8c copies the disk image file 4a to the file group 4c for each VM, generates the disk image file 4a capable of restoring the VM (S303), and terminates the processing.

As described above, the management apparatus 1 determines whether the software stored in the external repository server 11, which was associated with the disk image file 4a stored in the storage unit 4, has been updated. Then, if determined that the software has been updated, the management apparatus 1 obtains the software before the update from the external repository server 11, and stores the software into the storage unit 4. Then, if there is software before the update in the storage unit 4, the management apparatus 1 obtains the software before the update from the storage unit 4, and generates the disk image file 4a capable of restoring the VM using the software before the update, and the disk image file 4a. Accordingly, with the management apparatus 1, it becomes possible to restore a VM even if the data stored in the external repository server 11 is updated.

Also, the management apparatus 1 determines whether part of data of a VM image file has been updated or not. Then, the management apparatus 1 generates the image file capable of restoring a VM using the part of data of the VM image file held by the management apparatus 1, and part of data of the image file of the downloaded VM before the update.

Now, a description has been given of the embodiments on the apparatus disclosed so far. However, the present disclosure may be carried out in various modes other than the embodiment described above.

Figure 13:
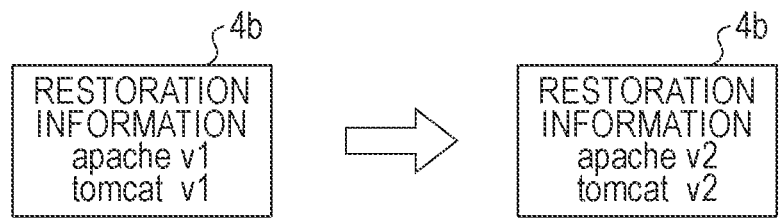
FIG. 13 is an explanatory diagram of an example of processing executed by a management apparatus according to a variation.

For example, it is possible for the disclosed apparatus to receive an update of the recorded contents of the restoration information 4b by a user through the input unit 2. In this case, it is possible for the disclosed apparatus to download the RPM package recorded the restoration information 4b using the restoration information 4b whose record contents have been updated from the external repository server 11, and to restore the disk image file 4a. Thereby, it is possible to update the version, and the like of the RPM package of the VM at restoration time to a new version by simple operation of updating the restoration information 4b. FIG. 13 is an explanatory diagram of an example of processing executed by a management apparatus according to a variation. The example in FIG. 13 illustrates the case where the management apparatus has received an update from the RPM packages of "apache v1" and "tomcat v1", which are recorded in the restoration information 4b, to the RPM packages of "apache v2", and "tomcat v2" through the input unit 2. In the case of the example in FIG. 13, the management apparatus downloads the RPM packages of "apache v2" and "tomcat v2", recorded in the restoration information 4b, from the external repository server 11, and restores the disk image file 4a. Accordingly, it is possible to update the versions of "apache", and "tomcat" of the VM at restoration time to new versions by simple operation of updating the restoration information 4b.

Figure 14:
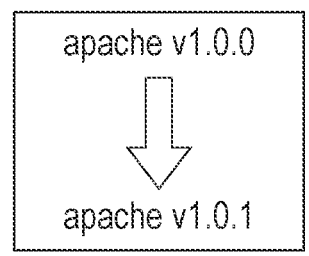
FIG. 14 is an explanatory diagram of an example of processing executed by a management apparatus according to a variation.

Also, it is possible for the disclosed apparatus to control not to download the RPM package when detecting an update of a RPM package stored in the external repository server 11 if the update is minor. Here, as an example of the case where the update is minor, for example, a case where the update of the RPM package is simple bug fixes is given. FIG. 14 is an explanatory diagram of an example of processing executed by the management apparatus according to a variation. As illustrated in FIG. 14, it is possible for the management apparatus to control not to download "apache v1.0.0" before the update if a minor update of the bug fixes from "apache v1.0.0" to "apache v1.0.1" is detected. Thereby, in the case of a minor update, or the like, it is possible to suppress downloading the RPM package that is not so different functionally, and thus to reduce processing load of the management apparatus.

In this regard, if there is an update, the disclosed apparatus downloads the RPM package before the update. Then, it is possible for the disclosed apparatus to control as to whether to restore the image, or not to restore the image based on the information on the update, which is added to the downloaded RPM package by the external repository server 11. For example, if the RPM package is updated in order to cope with vulnerability, the downloaded RPM package has vulnerability. If a VM is restored using the RPM package downloaded at this time, the restored VM has vulnerability. Thus, if the information on the added update indicates an update coping with vulnerability, it is possible for the management apparatus to control not to restore the image using the downloaded RPM package.

Also, among each processing described in each embodiment, it is possible to manually perform all of or part of the processing that is described as being performed automatically. Also, among each processing described in each embodiment, it is possible to automatically perform, by a publicly known method, all of or part of the processing that is described as being performed manually.

Also, it is possible to divide each step of each processing described in each embodiment into any detailed parts, or to put together each step in accordance with various loads, a use state, or the like. Also, it is possible to omit a step.

Also, it is possible to change an order of processing in each step of each processing described in each embodiment in accordance with various loads, a use state, or the like.

Also, each component of each device illustrated in the figures is conceptual and functional element, and not has to be physically configured as illustrated in the figures. That is to say, a specific state of distribution and integration of each device is not limited to that illustrated in the figures, and it is possible to configure all of or part of each device by functionally or physically distributing or integrating the device in any units in accordance with various loads, a use state, and the like.

Data Processing Program

Figure 15:
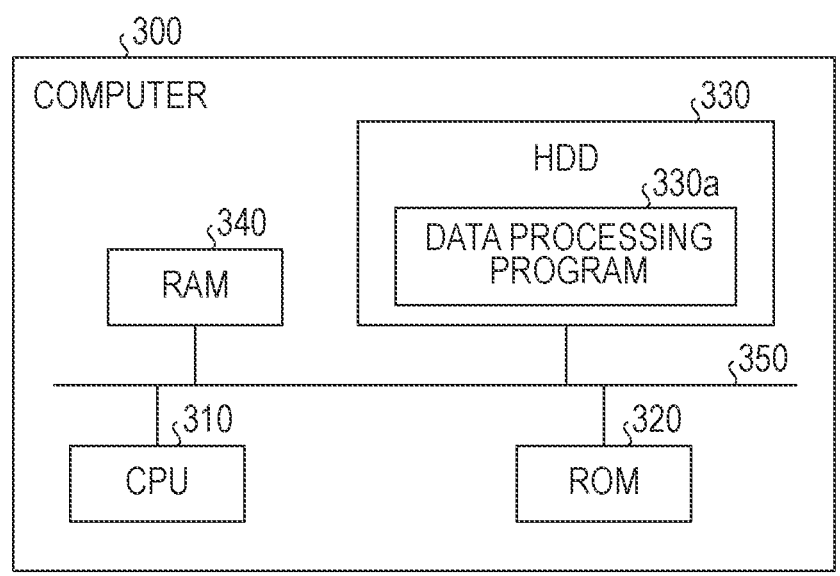
FIG. 15 is a diagram illustrating a computer that executes a data processing program.

Also, it is possible to achieve various kinds of processing of the management apparatus 1, described in the above-described embodiment, by executing a program provided in advance on a computer system, such as a personal computer, a workstation, or the like. Thus, in the following, a description will be given of an example of a computer executing a data processing program having the same functions as those of the management apparatus 1 described in the above-described embodiment with reference to FIG. 15. FIG. 15 is a diagram illustrating a computer that executes the data processing program.

As illustrated in FIG. 15, a computer 300 includes a CPU 310, a ROM 320, a hard disk drive (HDD) 330, and a RAM 340. The individual devices 310 to 340 are connected through a bus 350.

The ROM 320 stores a basic program, such as an operating system (OS), and the like. Also, the HDD 330 stores a data processing program 330a that performs the same functions as those of the decomposition unit 5a, the monitor unit 5b, and the restoration unit 5c, which are illustrated in the above-described embodiments, in advance.

Then, the CPU 310 reads a data processing program 330a from the HDD 330 to execute the program.

In this regard, the above-described data processing program 330a does not have to be stored in the HDD 330 from the beginning.

For example, the data processing program 330a is stored in a "portable physical medium", such as a flexible disk (FD), a CD-ROM, a DVD disc, a magneto-optical disc, an IC card, or the like, which is to be inserted into the computer 300. Then, the computer 300 may read the data processing program 330a from one of these, and execute the program.

Further, the data processing program 330a may be stored in "another computer (or a server)", or the like, which is connected to the computer 300 through a public network, the Internet, a LAN, a WAN, or the like. Then, the computer 300 may read the data processing program 330a from one of these, and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process, the process comprising:
   detecting whether second data, stored in a second storage device, updated from first data stored in a first storage device has been updated,
   upon detecting that the second data has been updated, obtaining the second data before update from the second storage device, and storing the second data into the first storage device, and
   when the second data is contained in the first storage device, obtaining the second data from the first storage device, and generating third data using the second data, and the first data.

2. The non-transitory, computer-readable recording medium according to claim 1,
   wherein the detecting whether second data has been updated includes detecting whether the second data being data of part of a device image file has been updated, and
   the generating third data includes generating the device image file using data of part of the device image file held by the computer, and the second data.

3. The non-transitory, computer-readable recording medium according to claim 1,
   wherein the detecting whether second data has been updated includes detecting whether the second data recorded in predetermined information has been updated, and if record contents of the predetermined information has been updated, detecting whether data recorded in the updated predetermined information has been updated.

4. The non-transitory, computer-readable recording medium according to claim 1,
   wherein the obtaining the second data before update, and the storing the second data into the first storage device includes performing control as to whether to obtain the second data before the update, or not to obtain the second data before the update in accordance with a detected update state.

5. The non-transitory, computer-readable recording medium according to claim 1,
   wherein the generating third data includes performing control as to whether to generate the third data or not in accordance with a detected update type.

6. The non-transitory, computer-readable recording medium according to claim 1, wherein each of the first data and the second data is system backup image data over the Internet.

7. A data processing apparatus, comprising:
   a memory; and
   a processor coupled to the memory, and configured to execute a process including,
   detecting whether second data updated from first data, stored in a second storage device, associated with the first data stored in a first storage device has been updated,
   upon detecting that the second data has been updated, obtaining the second data before update from the second storage device, and storing the second data into the first storage device, and when the second data is contained in the first storage device, obtaining the second data from the first storage device, and generating third data using the second data, and the first data.

8. The data processing apparatus according to claim 7, wherein the detecting whether second data has been updated includes detecting whether the second data being data of part of a device image file has been updated, and the generating third data includes generating the device image file using data of part of the device image file held by the processor.

9. The data processing apparatus, according to claim 7, wherein each of the first data and the second data is system backup image data over the Internet.

10. A method of processing data for a computer to execute a process, comprising:

detecting whether second data, stored in a second storage device, associated with first data stored in a first storage device has been updated or not, upon detecting that the second data has been updated, obtaining the second data before update from the second storage device, and storing the second data into the first storage device, and when the second data is contained in the first storage device, obtaining the second data from the first storage device, and generating third data using the second data, and the first data.

11. The method of processing data, according to claim 10, wherein the detecting whether second data has been updated includes detecting whether the second data being data of part of a device image file has been updated, and the generating third data includes generating the device image file using data of part of the device image file held by the computer, and the second data.

12. The method of processing data, according to claim 10, wherein each of the first data and the second data is system backup image data over the Internet.

* * * * *